United States Patent
Kim (10) Patent No.: US 9,095,960 B2
(45) Date of Patent: Aug. 4, 2015

(54) TORQUE CONTROL WRENCH ASSEMBLY FOR A VEHICLE

(75) Inventor: Namsuk Kim, Gimpo-si (KR)

(73) Assignee: SEWON PM TECH. CO., LTD., Gimpo-Si, Gyeonggi-Do (KR)

( * ) Notice: Subject to any disclaimer, the term of this patent is extended or adjusted under 35 U.S.C. 154(b) by 206 days.

(21) Appl. No.: 13/595,330

(22) Filed: Aug. 27, 2012

(65) Prior Publication Data

US 2013/0291693 A1 Nov. 7, 2013

(30) Foreign Application Priority Data

May 2, 2012 (KR) .................. 10-2012-0046571

(51) Int. Cl.
| | |
|---|---|
| B25B 23/142 | (2006.01) |
| B25B 17/00 | (2006.01) |
| B25B 13/46 | (2006.01) |
| B25B 17/02 | (2006.01) |
| B25B 23/00 | (2006.01) |
| B25B 23/14 | (2006.01) |
| B60B 29/00 | (2006.01) |

(52) U.S. Cl.
CPC .............. *B25B 17/00* (2013.01); *B25B 13/461* (2013.01); *B25B 13/466* (2013.01); *B25B 17/02* (2013.01); *B25B 23/0078* (2013.01); *B25B 23/141* (2013.01); *B25B 23/1427* (2013.01); *B60B 29/005* (2013.01); *B60B 2900/114* (2013.01)

(58) Field of Classification Search
CPC .. B25B 23/14; B25B 23/141; B25B 23/0078; B25B 23/1427; B25B 17/02; B25B 13/461; B25B 13/466; B25B 17/00; B60B 29/005

USPC ............. 81/473, 475, 57.36, 57.3, 57.24, 476
See application file for complete search history.

(56) References Cited

U.S. PATENT DOCUMENTS

| | | | | |
|---|---|---|---|---|
| 2,733,622 | A | * | 2/1956 | Grunbaum ...................... 81/475 |
| 2,764,882 | A | * | 10/1956 | Bosworth ....................... 81/475 |
| 3,287,935 | A | * | 11/1966 | Grunbaum ...................... 464/47 |

(Continued)

FOREIGN PATENT DOCUMENTS

| | | |
|---|---|---|
| DE | 3237325 | 4/1984 |
| EP | 2377650 | 10/2011 |

(Continued)

OTHER PUBLICATIONS

Extended European Search Report dated Jul. 18, 2013, with English Translation; Application No. 12181747.2.

*Primary Examiner* — Hadi Shakeri
(74) *Attorney, Agent, or Firm* — Young & Thompson (57) ABSTRACT

A torque control wrench assembly for a vehicle is disclosed. The assembly includes a handle, a ratchet unit having a first ratchet for rotating in engagement with the handle and a second ratchet engaged with the first ratchet, for transferring rotational force applied from the first ratchet, a transmission unit engaged with the second ratchet, for changing the rotational force transferred from the second ratchet, a socket unit having one end engaged with the transmission unit and the other end engaged with a wheel nut, for tightening or loosening the wheel nut by receiving the rotational force, a housing opened at both ends, and a torque control unit into which the first ratchet is inserted and which is engaged with the housing, covering an opened end of the housing, for controlling the rotational force applied to the socket unit by pressing the first ratchet.

7 Claims, 6 Drawing Sheets

(56) References Cited

U.S. PATENT DOCUMENTS

5,129,293 A * 7/1992 Larson et al. .................. 81/483
7,490,535 B2 * 2/2009 Ha .................. 81/475
8,443,699 B2 5/2013 Ha
2008/0098856 A1 5/2008 Ha

FOREIGN PATENT DOCUMENTS

| KR | 2000-0003297 | 2/2000 |
| KR | 10-0798265 | 1/2008 |
| KR | 10-2011-0116517 | 10/2011 |
| WO | 9814309 | 4/1998 |

* cited by examiner

TORQUE CONTROL WRENCH ASSEMBLY FOR A VEHICLE

This application claims the benefit of Korean Patent Application No. 10-2012-0046571, filed on May 2, 2012, which is hereby incorporated by reference as if fully set forth herein.

BACKGROUND OF THE INVENTION

1. Field of the Invention

The present invention relates to a torque control wrench assembly for a vehicle, and more particularly, to a torque control wrench assembly for a vehicle, which can restrict the amount of torque transferred to a socket that tightens or loosens a wheel nut in engagement with the wheel nut and which is highly portable.

2. Discussion of the Related Art

A vehicle wheel is generally fastened to a vehicle by means of a bolt fit through one side of a drum and a wheel nut engaged with the bolt. A wrench is used to tighten or loosen the wheel nut that fastens the vehicle wheel. The wrench tightens or loosens the wheel nut by transferring user-generated rotational force to a socket engaged with the wheel nut.

The wheel nut is screwed on the bolt with a predetermined strength and the wrench tightens or loosens the bolt by transferring rotational force corresponding to the engagement strength between the wheel nut and the bolt to the socket.

However, if rotational force exceeding the engagement strength between the wheel nut and the bolt is applied to the wheel nut, the wheel nut and the bolt are too tightly engaged and as a result, the relatively weak bolt is damaged by the wheel nut.

To avert this problem, a conventional wrench controls rotational force for a socket by changing the length or rotational axis of a handle that generates the rotational force at one end of the wrench. Alternatively, the amount of rotational force applied to the socket can be controlled by means of an additional device for controlling the rotational force, attached to one end of the wrench.

In the case where rotational force applied to a socket is controlled by changing the length or rotational axis of the handle of a wrench, a more or less different amount of rotational force may be applied to tighten or loosen a wheel nut depending on an operator's manipulation. Therefore, it is difficult to transfer an accurate rotational force corresponding to the engagement strength between the wheel nut and the bolt to the socket.

The use of an additional rotational force controlling device attached to one end of a wrench makes the wrench bulky, thereby decreasing the portability and use convenience of the wrench.

SUMMARY OF THE INVENTION

Accordingly, the present invention is directed to a torque control wrench assembly for a vehicle that substantially obviates one or more problems due to limitations and disadvantages of the related art.

An object of the present invention is to provide a torque control wrench assembly for a vehicle, which can control the amount of rotational force transferred to a socket engaged with a wheel nut and which is highly portable.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a torque control wrench assembly for a vehicle includes a handle for generating rotational force, a ratchet unit having a first ratchet for rotating in engagement with the handle and a second ratchet engaged with the first ratchet, for transferring rotational force applied from the first ratchet, a transmission unit engaged with the second ratchet, for changing the rotational force transferred from the second ratchet, a socket unit having one end engaged with the transmission unit and the other end engaged with a wheel nut, for tightening or loosening the wheel nut by receiving the rotational force, a housing opened at both ends, for accommodating the ratchet unit and the transmission unit, and a torque control unit into which the first ratchet is inserted and which is engaged with the housing, covering an opened end of the housing, for controlling the rotational force applied to the socket unit by pressing the first ratchet and thus controlling engagement strength between the first and second ratchets.

The torque control unit includes a washer unit for pressing or releasing the first ratchet, and a pressure control unit engaged with the housing, covering the opened end of the housing, for controlling pressure that the washer unit applies to the first ratchet by pressing or releasing the washer unit.

The washer unit may include a first washer having a height increasing toward a center of the first washer, for allowing the first ratchet to be inserted thereinto in close contact with one surface of the first ratchet, and a second washer having a height increasing toward a center of the second washer and closely contacting the first washer, for allowing the first ratchet to be inserted thereinto.

The pressure control unit may include a first pressure controller engaged with the housing, covering the opened end of the housing, for allowing the first ratchet to be inserted thereinto, a second pressure controller rotatably engaged with the first pressure controller, for allowing the first ratchet to be inserted thereinto and pressing the second washer by rotating in a direction in close contact with one surface of the second washer, and a locker installed at the second pressure controller, for fixedly locking the second pressure controller at a rotated position.

An installation hole may penetrate through the second pressure controller, for allowing the locker to be inserted thereinto.

At least one locking groove may be formed into a surface of the first pressure controller that contacts the second pressure controller.

The locker may include a ball inserted into the installation hole and partially inserted into the at least one locking groove, a spring inserted into the installation hole to elastically support the ball, and a cover screwed into the installation hole, for fixedly positioning the spring.

A first sun gear may be installed on one surface of the second ratchet.

The transmission unit may include a first transmission having a first planet gear engaged with the first sun gear on one surface of the first transmission and a second sun gear on the other surface of the first transmission, and a second transmission having a second planet gear engaged with the second sun gear on one surface of the second transmission and a transfer shaft on the other surface of the second transmission, for transferring the rotational force to the socket unit.

A guide gear may be formed in the housing, for guiding the first and second planet gears.

The housing may further include a support unit for fixedly positioning the support.

The support unit may include a first support extended to a predetermined length from an outer circumferential surface of the housing, a second support movably installed at the first support and engaged with a wheel nut apart from the wheel nut engaged with the socket unit by a predetermined distance, and a fixing nut for fixedly positioning the second support.

In another aspect of the present invention, a torque control wrench assembly for a vehicle includes a handle for generating rotational force, a ratchet unit having a first ratchet for rotating in engagement with the handle and a second ratchet engaged with the first ratchet, for transferring rotational force applied from the first ratchet, a transmission unit engaged with the second ratchet, for changing the rotational force transferred from the second ratchet, a socket unit having one end engaged with the transmission unit and the other end engaged with a wheel nut, for tightening or loosening the wheel nut by receiving the rotational force, a housing opened at both ends, for accommodating the ratchet unit and the transmission unit, and a torque control unit into which the first ratchet is inserted and which is engaged with the housing, covering an opened end of the housing, for controlling the rotational force applied to the socket unit by pressing the first ratchet and thus controlling engagement strength between the first and second ratchets. The torque control unit includes a washer unit for pressing the first ratchet, and a pressure control unit rotatably engaged with the housing, covering the opened end of the housing, for controlling pressure that the washer unit applies to the first ratchet by pressing or releasing the washer unit through rotation in a direction.

The washer unit may include a first washer having a height increasing toward a center of the first washer, for allowing the first ratchet to be inserted thereinto in close contact with one surface of the first ratchet, and a second washer having a height increasing toward a center of the second washer and closely contacting the first washer, for allowing the first ratchet to be inserted thereinto.

The pressure control unit may press the second washer by rotating in a direction.

The torque control unit may further include a knob installed at the pressure control unit, and a fixing screw installed on the knob, for fixing the pressure control unit at a rotated position.

The knob may be installed on one surface of the pressure control unit having a predetermined curvature.

A movement groove may be formed in the housing, for allowing the knob to move therealong.

The knob may be installed at the pressure control unit, in parallel to a length direction of the first ratchet.

The torque control wrench assembly may further include a cover for covering the housing, while covering one surface of the pressure control unit.

The torque control wrench assembly may further include an indicator interposed between the pressure control unit and the cover and engaged with the knob.

In a further aspect of the present invention, a torque control wrench assembly for a vehicle includes a handle for generating rotational force, a ratchet unit having a first ratchet for rotating in engagement with the handle and a second ratchet engaged with the first ratchet, for transferring rotational force applied from the first ratchet, a transmission unit engaged with the second ratchet, for changing the rotational force transferred from the second ratchet, a socket unit having one end engaged with the transmission unit and the other end engaged with a wheel nut, for tightening or loosening the wheel nut by receiving the rotational force, a housing opened at both ends, for accommodating the ratchet unit and the transmission unit, and a torque control unit into which the first ratchet is inserted and which is engaged with the housing, covering an opened end of the housing, for controlling the rotational force applied to the socket unit by pressing the first ratchet and thus controlling engagement strength between the first and second ratchets. The torque control unit includes a washer unit for pressing the first ratchet, and a pressure control unit engaged with the housing, covering the opened end of the housing, for controlling pressure that the washer unit applies to the first ratchet by pressing or releasing the washer unit.

The washer unit may include a first washer having a height increasing toward a center of the first washer, for allowing the first ratchet to be inserted thereinto in close contact with one surface of the first ratchet, and a second washer having a height increasing toward a center of the second washer and closely contacting the first washer, for allowing the first ratchet to be inserted thereinto.

The pressure control unit may include a first pressure controller engaged with the housing, while covering the opened end of the housing, and having a installation hole, which is formed by penetrating a surface of the first pressure controller and a second pressure controller installed in the installation hole, for pressing the second washer.

The second pressure controller may be screwed into the installation hole.

A knob may be engaged with one end of the second pressure controller.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

The objectives and effects of the present invention and the technical configurations of the present invention to achieve them will be apparent with reference to embodiments of the present invention described in detail with the attached drawings. A detailed description of a generally known function and structure of the present invention will be avoided lest it should obscure the subject matter of the present invention. Although the terms used in the present invention are selected from generally known and used terms, taking into account the structures, roles, and functions of the present invention, they are subject to change depending on the intention of a user or an operator or practices.

It is to be clearly understood that the present invention may be implemented in various manners, not limited to embodiments as set forth herein. The embodiments of the present invention are provided only to render the disclosure of the present invention comprehensive and indicate the scope of the present invention to those skilled in the art. The present invention is defined only by the appended claims. Accordingly, the scope of the invention should be determined by the overall description of the specification.

Through the specification, when it is said that some part "includes" a specific element, this means that the part may further include other elements, not excluding them, unless otherwise mentioned.

Now a detailed description will be given of the structure and operational effects of a torque control wrench assembly according to an embodiment of the present invention with reference to the attached drawings.

Figure 1:
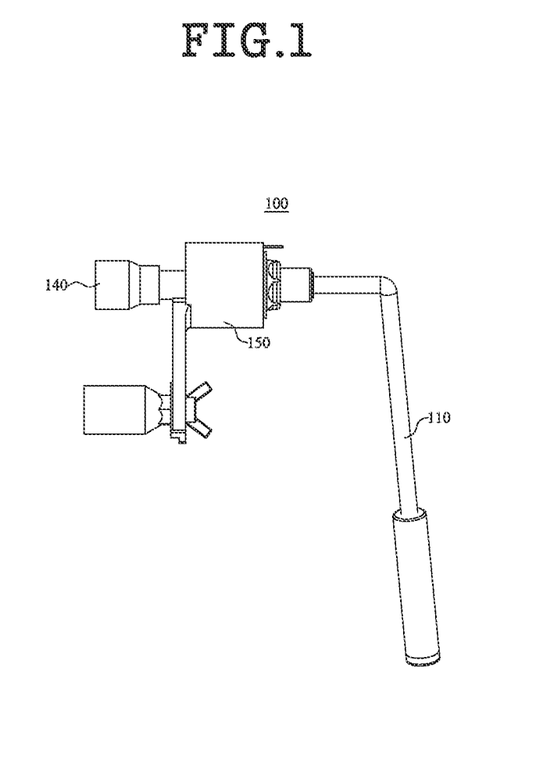
FIG. 1 is a side view illustrating a torque control wrench assembly for a vehicle according to an embodiment of the present invention.
Figure 2:
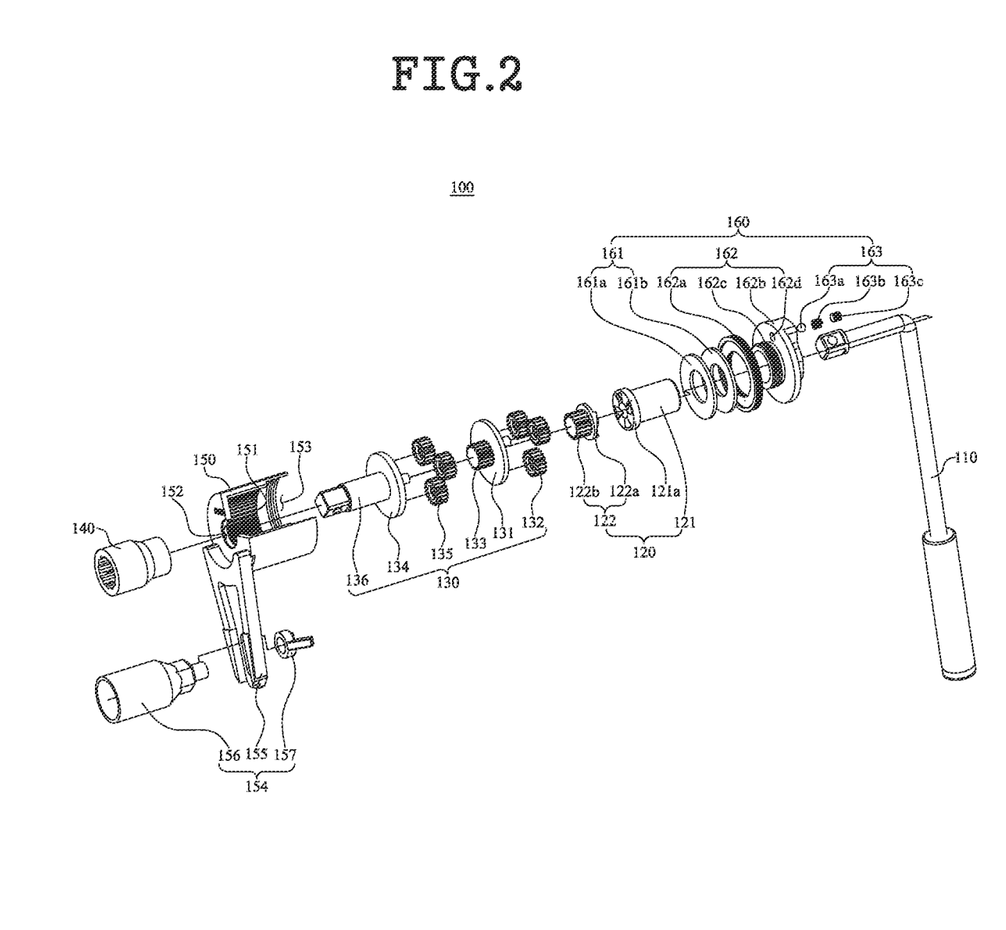
FIG. 2 is an exploded perspective view illustrating the torque control wrench assembly for a vehicle according to the embodiment of the present invention.
Figure 3:
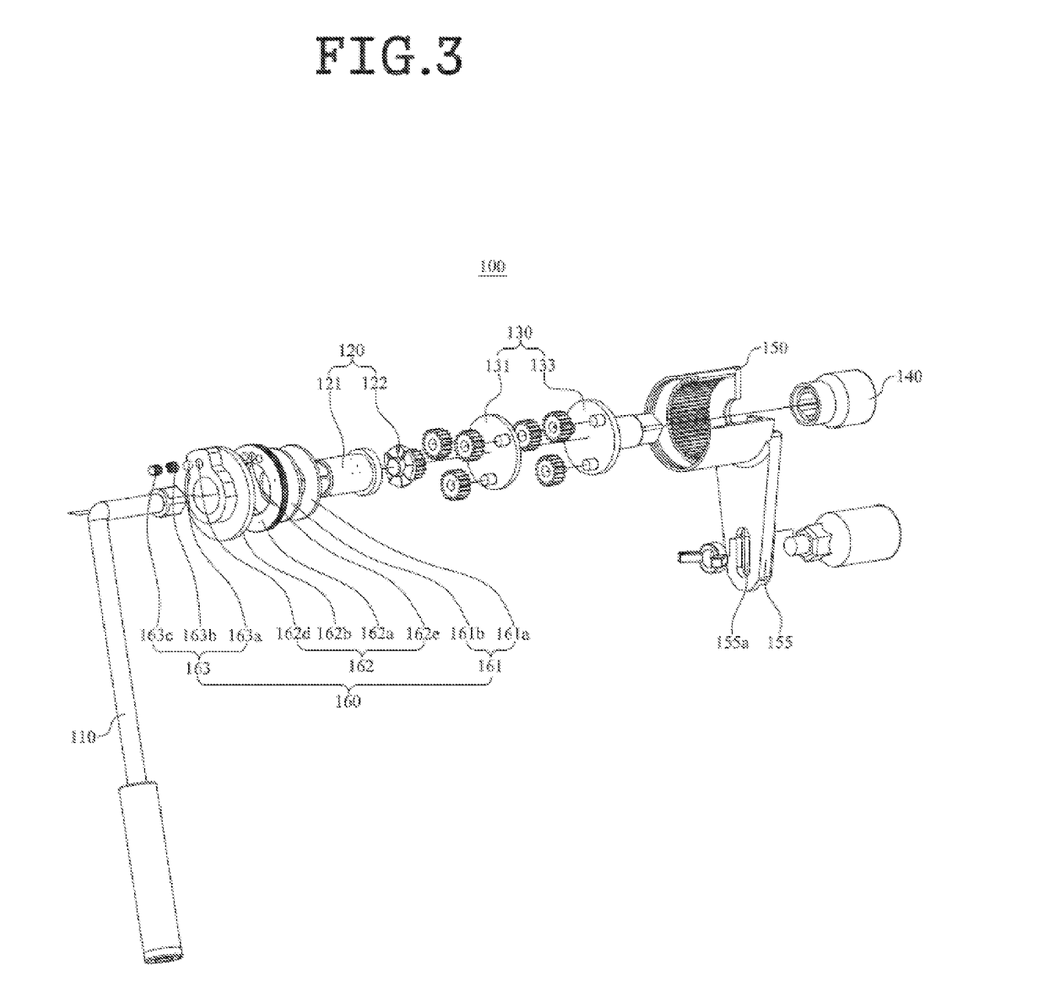
FIG. 3 is an exploded perspective view illustrating the torque control wrench assembly for a vehicle according to the embodiment of the present invention, seen at a different angle from FIG. 2.

FIG. 1 is a side view illustrating a torque control wrench assembly 100 for a vehicle according to an embodiment of the present invention and FIGS. 2 and 3 are exploded perspective views illustrating the torque control wrench assembly 100 for a vehicle according to the embodiment of the present invention, seen at different angles.

Referring to FIGS. 1, 2 and 3, the torque control wrench assembly 100 for a vehicle may include a handle 110 for generating rotational force, a ratchet unit 120 having a first ratchet 121 for rotating in engagement with the handle 110 and a second ratchet 122 engaged with the first ratchet 121, for transferring rotational force applied from the first ratchet 121, a transmission unit 130 engaged with the second ratchet 122, for changing the rotational force transferred from the second ratchet 122, a socket unit 140 having one end engaged with the transmission unit 130 and the other end engaged with a wheel nut, for tightening or loosening the wheel nut by receiving the rotational force, a housing 150 opened at both ends, for accommodating the ratchet unit 120 and the transmission unit 130, and a torque control unit 160 into which the first ratchet 121 is inserted and which is engaged with the housing 150, covering an opened end of the housing 150, for controlling the rotational force applied to the socket unit 140 by pressing the first ratchet 121 and thus controlling the engagement strength between the first and second ratchets 121 and 122.

Before describing the torque control wrench assembly 100 for a vehicle according to the embodiment of the present invention in detail, a direction toward the socket unit 140 is defined as forward and a direction toward the handle 110 is defined as backward in the drawings.

When a user rotates the handle 110 in one direction, the handle 110 may generate rotational force with which the socket unit 140 is rotated. The handle 110 may generate torque by rotating in one direction around a central axis which corresponds to its portion engaged with the first ratchet 121.

The first ratchet 121 of the ratchet unit 120 may be engaged with the handle 110 at one end thereof. A handle insertion portion (not shown) may be recessed into the first ratchet 121 in the forward direction, for insertion of the handle 110. A specific part of the handle 110 may be inserted into the handle insertion portion so that the handle 110 is engaged with the first ratchet 121.

The handle insertion portion may be shaped in correspondence with the shape of the inserted part of the handle 110. For example, the specific part of the handle 110 inserted into the handle insertion portion may be shaped into a hexagon. Then the handle insertion portion may also be shaped into a hexagon corresponding to the shape of the inserted end of the handle 110. Consequently, the first ratchet 121 can readily receive rotational force from the handle 110.

When the first ratchet 121 rotates by the rotational force generated from the handle 110, the first ratchet 121 may generate torque.

A first tooth 121a having a step of a predetermined height may be formed at the other end of the first ratchet 121. The step of the first tooth 121a may face forward.

The second ratchet 122 of the ratchet unit 120 may be brought into teeth-engagement with the first ratchet 121. A second tooth 122a corresponding to the first tooth 121a of the first ratchet 121 may be formed at one end of the second ratchet 122. The second tooth 122a may have a step of a predetermined height facing backward.

As the second tooth 122a of the second ratchet 122 is engaged with the first tooth 121a of the first ratchet 121, the second ratchet 122 may be rotated by the first ratchet 121. Along with the rotation of the second ratchet 122, the torque control wrench assembly 100 for a vehicle may transfer torque generated from the handle 110 to the socket unit 140.

When the torque control wrench assembly 100 for a vehicle tightens a wheel nut by clockwise rotation of the handle 110, the ratchet unit 120 rotates with an inclined surface of the first tooth 121a in close contact with an inclined surface of the second tooth 122a. Therefore, the ratchet unit 120 may transfer the torque generated from the handle 110 to the transmission unit 130 which will be described later. On the other hand, when the torque control wrench assembly 100 for a vehicle loosens the wheel nut by counterclockwise rotation of the handle 110, the ratchet unit 120 rotates with the step of the first tooth 121a caught over the step of the second tooth 122a, thereby transferring torque generated from the handle 110 to the transmission unit 130.

A first sun gear 122b may be installed on the other surface of the second ratchet 122. As the sun gear 122b is fixed to the second ratchet 122, the sun gear 122b may rotate together with the second ratchet 122.

The transmission unit 130 includes a first transmission 131. The first transmission 131 may be provided, on one surface thereof, with one or more planet gears 132 engaged with the first sun gear 122b. The planet gears 132 may be mounted rotatably on the surface of the first transmission 131. The first transmission 131 may rotate in view of teeth-engagement between the first planet gears 132 and the first sun gear 122b.

A second sun gear 133 may be installed on the other surface of the first transmission 131. As the second sun gear 133 is fixed to the first transmission 131, the second sun gear 133 may rotate along with the first transmission 131.

The transmission unit 130 includes a second transmission 134. The second transmission 134 may be provided on one surface thereof, with one or more second planet gears 135 in teeth-engagement with the second sun gear 133. The second planet gears 135 may be rotatably mounted on the surface of the second transmission 134. The second transmission 134 may rotate in view of the teeth-engagement between the second planet gears 135 and the second sun gear 133.

A guide gear 151 may be formed inside the housing 150, for guiding the first and second planet gears 132 and 135. As the first and second gears 132 and 135 rotate in teeth-engagement with the guide gear 151, they may move along an inner circumferential surface of the housing 150. That is, the first transmission 131 with the first planet gears 132 installed thereon may rotate within the housing 150 in the same direction to a direction in which the second ratchet 122 rotates, and the second transmission 134 with the second planet gears 135 installed thereon may rotate within the housing 150 in the same direction to the rotating direction of the first transmission 131. Accordingly, the second transmission 134 may rotate in the same direction as the handle 110, thereby generating torque.

A transfer shaft 136 may be installed on the other surface of the second transmission 134. Since the transfer shaft 136 is fixed to the other surface of the second transmission 134, the transfer shaft 136 may rotate along with the second transmission 134. The socket unit 140 may be installed at one end of the transfer shaft 136. Therefore, torque resulting from rotation of the handle 110 may be transferred to the socket unit 140, thereby loosening or tightening a wheel nut engaged with the socket 140.

The housing 150 may be opened at both ends and accommodate the ratchet unit 120 and the transmission unit 130. A first opening 152 having a first diameter may be formed at one opened end of the housing 150 and a second opening 153 having a second diameter may be formed at the other opened end of the housing 150. The second diameter may be larger than the first diameter.

The first diameter of the first opening 152 may be larger than the diameter of the transfer shaft 136 of the second transmission unit 134. That is, a specific part of the transfer shaft 136 may protrude outward from the housing 150 through the first opening 152 and thus may be engaged with the socket unit 140.

The housing 150 may further include a support unit 154 for fixedly positioning the housing 150. The support unit 154 is engaged with a wheel nut spaced from the wheel nut engaged with the socket unit 140 by a predetermined distance, thereby preventing rotation of the housing 150.

The support unit 154 may include a first support 155 extended to a predetermined length from an outer surface of the housing 150. A guide hole 155a may penetrate through a portion of the first support 155 (see FIG. 3).

The support unit 154 may include a second support 156 which is movably installed in the first support 155 and engaged with the wheel nut apart from the wheel nut engaged with the socket unit 140. A specific part of the second support 156 may be inserted into the guide hole 155a. The second support 156 may move along the guide hole 155a.

The support unit 154 may include a fixing nut 157. The fixing nut 157 may be engaged with the second support 156 of which the specific part is inserted into the guide hole 155a. Therefore, the fixing nut 157 may readily fix the second support 156 at a displaced position.

The torque control unit 160 includes a washer unit 161 for pressing or releasing the first ratchet 121. The washer unit 161 may include a first washer 161a brought into close contact with one surface of the first ratchet 121. A hole may penetrate through the center of the first washer 161a, for allowing the first ratchet 121 to be inserted thereinto. The first washer 161a may be formed in such a manner that it gets higher toward its center. Herein, the height of the first washer 161a may increase in the forward direction.

The washer unit 161 may include a second washer 161b brought into close contact with one surface of the first washer 161a. A hole may penetrate through the center of the second washer 161b, for allowing the first ratchet 121 to be inserted thereinto. The second washer 161b may be formed in such a manner that it gets higher toward its center. Herein, the height of the second washer 161b may increase in the backward direction. That is, a section of the washer unit 161 in which the second washer 161b closely contacts one surface of the first washer 161a may be shaped into a diamond.

The torque control unit 160 includes a pressure control unit 162 which is engaged with the housing 150, covering an opened end of the housing 150, for controlling pressure applied to the first ratchet 121 by the washer unit 161 by pressing or releasing the washer unit 161.

The pressure control unit 162 may include a first pressure controller 162a that covers the opened end of the housing 150. Specifically, the first pressure controller 162a may cover the second opening 153 of the housing 150. The first pressure controller 162a may be engaged with the housing 150, covering the second opening 153. Herein, the first pressure controller 162a may be screwed into the housing 150, to which the present invention is not limited.

A hole may penetrate through the center of the first pressure controller 162a, for allowing the first ratchet 121 to be inserted thereinto. The hole formed at the center of the first pressure controller 162a may have a larger diameter than the first ratchet 121. Therefore, the first ratchet 121 may be inserted into the first pressure controller 162a, spaced from the hole formed at the center of the first pressure controller 162a by a predetermined gap.

The pressure control unit 162 may include a second pressure controller 162b for pressing the second washer 161b, in engagement with the first pressure controller 162a. A hole may penetrate through the center of the second pressure controller 162b, for allowing the first ratchet 121 to be allowed thereinto. The hole formed at the center of the second pressure controller 162b may have a diameter smaller than that of the hole formed at the center of the first pressure controller 162a and larger than that of the first ratchet 121.

A fastening portion 162c may be formed along an outer circumferential surface of the hole formed at the center of the second pressure controller 162b. The fastening portion 162c may protrude to a predetermined length in the forward direction. The fastening portion 162c may be interposed between the first pressure controller 161a and the first ratchet 121. The fastening portion 162c has a screw thread on its outer circumferential surface and the hole formed at the center of the first pressure controller 162a has a screw thread on its inner surface. Thus, the fastening portion 162c may be screwed into the hole formed at the center of the first pressure controller 162a.

That is, the second pressure controller 162b may be rotatably engaged with the first pressure controller 162a by means of the fastening portion 162c. In addition, as the second pressure controller 162b rotates in a direction, a length to which the fastening 162c protrudes from the first pressure controller 162a may be changed. Therefore, the second pressure controller 162b may press or release the second washer 161b by means of the fastening portion 162c.

When the second pressure controller 162b presses or releases the second washer 161b, the first washer 161a closely contacting the second washer 161b presses or releases the first ratchet 121, thus adjusting the engagement strength between the first and second ratchets 121 and 122. As a result, the amount of torque generated by the torque control wrench assembly 100 for a vehicle can be restricted.

For example, if the fastening portion 162c moves forward along with clockwise rotation of the second pressure controller 162b and then presses the second washer 161b, the engagement force between the first and second ratchets 121 and 122 may be equivalent to a torque of up to 13 kg·m.

Subsequently, upon generation of a torque of 16 k·m up to 13 kg·m from the handle 110, the first tooth 121a of the first ratchet 121 may move over the inclined surface of the second tooth 122a of the second ratchet 122. While the first tooth 121a of the first ratchet 121 is moving over the inclined surface of the second tooth 122a of the second ratchet 122, the second ratchet 122 rotates by frictional force between the first and second teeth 121a and 122a, thereby transferring the torque generated from the handle 110 to the socket unit 140.

When the torque transferred to the first ratchet 121 exceeds 13 kg·m, the first tooth 121a may fall to the step of the second tooth 122a. Then, the first tooth 121a may move over the inclined surface of the second tooth 122a until a torque exceeding 13 kg·m is transferred again. That is, the torque exceeding 13 kg·m may not be transferred to the socket unit 140.

On the other hand, upon generation of a torque of 10 kg·m from the handle 110, the first tooth 121a may rotate in close contact with the inclined surface of the second tooth 122b, thus transferring the torque generated from the handle 110 to the socket unit 140.

When the fastening portion 162c moves backward along with counterclockwise rotation of the second pressure controller 162b and thus presses the second washer 161b with a weakening force, the engagement force between the first and second ratchets 121 and 122 may be equivalent to a torque of 9 kg·m.

Subsequently, upon generation of a torque of 15 kg·m from the handle 110, the first tooth 121a of the first ratchet 110 may move over the inclined surface of the second tooth 122a of the second ratchet 122. While the first tooth 121a of the first ratchet 121 is moving over the inclined surface of the second tooth 122a of the second ratchet 122, the second ratchet 122 rotates by frictional force between the first and second teeth 121a and 122a, thereby transferring the torque generated from the handle 110 to the socket unit 140.

When the torque transferred to the first ratchet 121 exceeds 9 kg·m, the first tooth 121a may fall to the step of the second tooth 122a. Then, the first tooth 121a may move over the inclined surface of the second tooth 122a until a torque exceeding 9 kg·m is transferred again. That is, the torque exceeding 9 kg·m may not be transferred to the socket unit 140.

On the other hand, upon generation of a torque of 8 kg·m from the handle 110, the first tooth 121a may rotate in close contact with the inclined surface of the second tooth 122b, thus transferring the torque generated from the handle 110 to the socket unit 140.

Therefore, the torque control wrench assembly 100 for a vehicle may engage a wheel nut with a bolt, with a limited torque transferred to the socket unit 140 by the ratchet unit 120. Consequently, the resulting prevention of excessive engagement between the wheel nut and the bolt leads to prevention of the wheel nut from damaging or breaking the bolt.

The pressure control unit 162 may include a locker 163 provided at the second pressure controller 162b, for locking the second pressure controller 162b at a rotated position. An installation hole 162d may penetrate through the second pressure controller 162b, for allowing the locker 163 to be inserted thereinto. The installation hole 162d may be formed in parallel to the length direction of the first ratchet 121.

In addition, at least one locking groove 162e may be formed into a surface of the first pressure controller 162a that contacts the second pressure controller 162b. The at least one locking groove 162e may be recessed in the forward direction. The at least one locking groove 162e may be formed into the first pressure controller 162a at a position corresponding to the installation hole 162d of the second pressure controller 162b.

The locker 163 may include a ball 163a inserted into the installation hole 162d and then partially inserted into the at least one locking groove 162e. The at least one locking groove 162e may be shaped in accordance with the shape of the ball 163a. For example, the locking groove 162e may be semicircular according to the shape of the ball 163a.

The locker 163 may include a spring 163b inserted into the installation hole 162d so that it is disposed at one side of the ball 163a to elastically support the ball 163a.

The locker 163 may include a cover 163c engaged with the installation hole 162d in such a manner that the cover 163c is disposed at one side of the spring 163b. The cover 163c may be screwed into the installation hole 162d to thereby control the elastic force of the spring 163b. The cover 163c may move forward along a screw thread of the installation hole 162d and then press the spring 163b, thus tightening contact between the ball 163a and the locking groove 162e by increasing the pressing force of the spring 163b against the ball 163a. Therefore, the second pressure controller 162b may be readily fixed at a rotated position.

As the second pressure controller 162b is fixed at a rotated position, the torque control wrench assembly 100 for a vehicle can readily restrict the amount of torque transferred to the socket unit 140.

Figure 4:
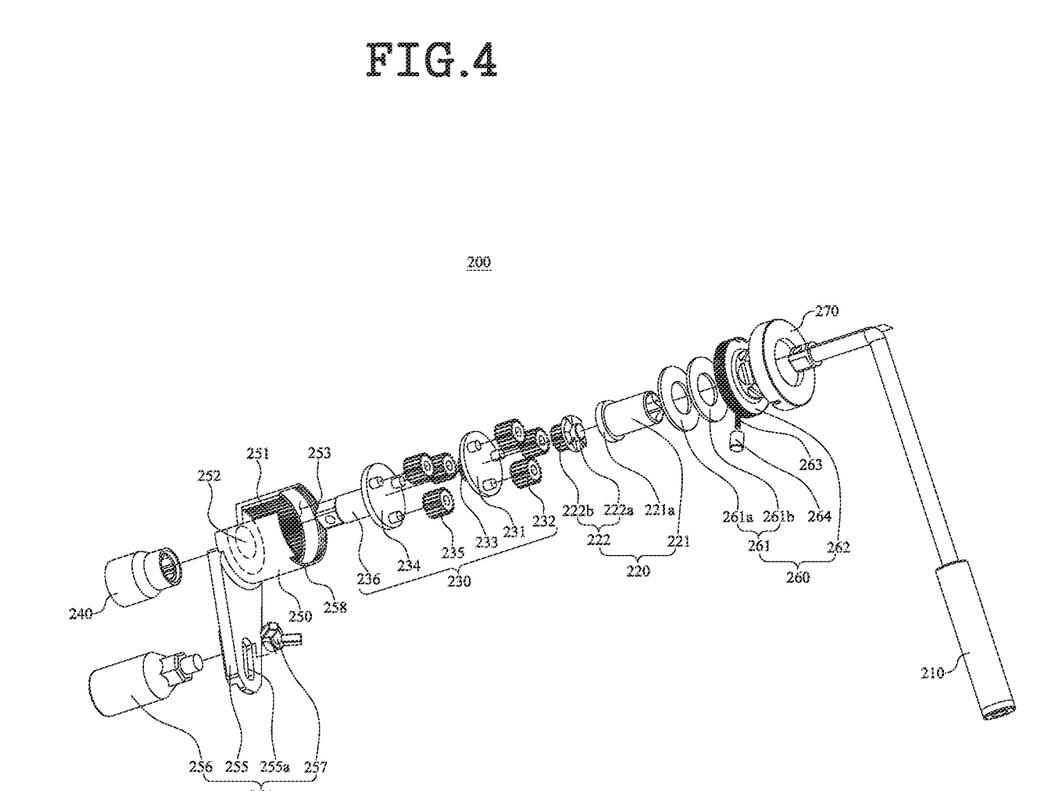
FIG. 4 is an exploded perspective view illustrating a torque control wrench assembly for a vehicle according to another embodiment of the present invention.

FIG. 4 is an exploded perspective view illustrating a torque control wrench assembly 200 for a vehicle according to another embodiment of the present invention. The torque control wrench assembly 200 for a vehicle will be described, centering on the difference from the torque control wrench assembly 100 for a vehicle according to the foregoing embodiment of the present invention.

Referring to FIG. 4, the torque control wrench assembly 200 for a vehicle may include a handle 210 for generating rotational force, a ratchet unit 220 having a first ratchet 221 for rotating in engagement with the handle 210 and a second ratchet 222 engaged with the first ratchet 221, for transferring rotational force applied from the first ratchet 221, a transmission unit 230 engaged with the second ratchet 222, for changing the rotational force transferred from the second ratchet 222, a socket unit 240 having one end engaged with the transmission unit 230 and the other end engaged with a wheel nut, for tightening or loosening the wheel nut by receiving the rotational force, a housing 250 opened at both ends, for accommodating the ratchet unit 220 and the transmission unit 230, and a torque control unit 260 into which the first ratchet 221 is inserted and which is engaged with the housing 250, covering an opened end of the housing 250, for controlling rotational force applied to the socket unit 240 by pressing the first ratchet 221 and thus controlling the engagement strength between the first and second ratchets 221 and 222.

Before describing the torque control wrench assembly 200 for a vehicle according to the embodiment of the present invention in detail, a direction toward the socket unit 240 is defined as forward and a direction toward the handle 210 is defined as backward.

A first tooth 221a having a step of a predetermined height may be formed at one end of the first ratchet 221. The step of the first tooth 221a may face forward.

The second ratchet 222 may be brought into teeth-engagement with the first ratchet 221. A second tooth 222a corresponding to the first tooth 221a of the first ratchet 221 may be formed at one end of the second tooth 222a. The second tooth 222a may have a step of a predetermined height facing backward. As the second tooth 222a of the second ratchet 222 is engaged with the first tooth 221a of the first ratchet 221, the second ratchet 222 may be rotated by the first ratchet 221.

When the torque control wrench assembly 200 for a vehicle tightens a wheel nut by clockwise rotation of the handle 210, the ratchet unit 220 rotates with an inclined surface of the first tooth 221a in close contact with an inclined surface of the second tooth 222a. Therefore, the ratchet unit 220 may transfer torque generated from the handle 210 to the transmission unit 230 which will be described later. On the other hand, when the torque control wrench assembly 200 for a vehicle loosens the wheel nut by counterclockwise rotation of the handle 210, the ratchet unit 220 rotates with the step of the first tooth 221a caught over the step of the second tooth 222a, thereby transferring torque generated from the handle 210 to the transmission unit 230.

A first sun gear 222b may be installed on the other surface of the second ratchet 222.

The transmission unit 230 may include a first transmission 231 which is provided, on one surface thereof, with one or more planet gears 232 engaged with the first sun gear 222b and, on the other surface thereof, with a second sun gear 233, and a second transmission 234 which is provided, on one surface thereof, with one or more second planet gears 235 in teeth-engagement with the second sun gear 233 and, on the other surface thereof, with a transfer shaft 236 for transferring rotational force to the socket unit 240.

The housing 250 may be opened at both ends and a guide gear 251 may be formed inside the housing 250, for guiding the first and second planet gears 232 and 235. A first opening 252 having a first diameter may be formed at one opened end of the housing 250 and a second opening 253 having a second diameter may be formed at the other opened end of the housing 250. The second diameter may be larger than the first diameter.

The housing 250 may further include a support unit 254 for fixedly positioning the housing 250. The support unit 254 may include a first support 255 that is extended to a predetermined length from an outer surface of the housing 250 and has a guide hole 255a penetrating through a portion of the first support 255, a second support 256 that is movably installed in the guide hole 255a of the first support 255 and engaged with a wheel nut apart from a wheel nut engaged with the socket unit 240 by a predetermined distance, and a fixing nut 257 for fixedly positioning the second support 256.

The torque control unit 260 includes a washer unit 261 for pressing or releasing the first ratchet 221. The washer unit 261 may include a first washer 261a brought into close contact with one surface of the first ratchet 221. A hole may penetrate through the center of the first washer 261a, for allowing the first ratchet 221 to be inserted thereinto. The first washer 261a may be formed in such a manner that it gets higher toward its center. Herein, the height of the first washer 261a may increase in the forward direction.

The washer unit 261 may include a second washer 261b brought into close contact with one surface of the first washer 261a. A hole may penetrate through the center of the second washer 261b, for allowing the first ratchet 221 to be inserted thereinto. The second washer 261b may be formed in such a manner that its height increases toward its center. Herein, the height of the second washer 261b may increase in the backward direction. That is, a section of the washer unit 261 in which the second washer 261b closely contacts the first washer 261a may be shaped into a diamond.

The torque control unit 260 may include a pressure control unit 262 engaged with the housing 250, covering an opened end of the housing 250, for controlling pressure applied to the first ratchet 221 by the washer unit 261 by pressing or releasing the washer unit 261.

The pressure control unit 262 may be inserted into the housing 250. A hole may penetrate through the center of the pressure control unit 262, for allowing the first ratchet 221 to be inserted thereinto. The pressure control unit 262 may have a screw thread formed on its outer circumferential surface and the housing 250 may have a screw thread formed on its inner circumferential surface in correspondence with the screw thread of the pressure control unit 262.

That is, the pressure control unit 262 may be rotatably installed in the housing 250. The pressure control unit 262 may rotate, moving forward or backward inside the housing 250, thereby pressing or releasing the second washer 261b.

When the pressure control unit 262 presses or releases the second washer 261b, the first washer 261a closely contacting the second washer 261b may press or release the first ratchet 221. Since the first washer 261a controls the engagement strength between the first and second ratchets 221 and 222, the amount of torque generated from the torque control wrench assembly 200 for a vehicle may be restricted.

For example, when the pressure control unit 262 rotates clockwise and thus moves forward, pressing the second washer 261b, the engagement force between the first and second ratchets 221 and 222 may be equivalent to a torque of 13 kg·m.

Subsequently, upon generation of a torque of 16 kg·m from the handle 210, the first tooth 221a of the first ratchet 221 may move over an inclined surface of the second tooth 222a of the second ratchet 222. While the first tooth 221a of the first ratchet 221 is moving over the inclined surface of the second tooth 222a, the second ratchet 222 rotates by frictional force between the first and second teeth 221a and 222a, thereby transferring the torque generated from the handle 210 to the socket unit 240.

When the torque transferred to the first ratchet 221 exceeds 13 kg·m, the first tooth 221a may fall to the step of the second tooth 222a. Then, the first tooth 221a may move over the inclined surface of the second tooth 222a until a torque exceeding 13 kg·m is transferred again. That is, the torque exceeding 13 kg·m may not be transferred to the socket unit 240.

On the other hand, upon generation of a torque of 10 kg·m from the handle 210, the first tooth 221a may rotate in close contact with the inclined surface of the second tooth 222b, thus transferring torque generated from the handle 210 to the socket unit 240.

When the pressure control unit 262 rotates counterclockwise, moves backward, and thus presses the second washer 261b with a weakening force, the engagement force between the first and second ratchets 221 and 222 may be equivalent to a torque of 9 kg·m.

Subsequently, upon generation of a torque of 15 kg·m from the handle 210, the first tooth 221a of the first ratchet 221 may move over the inclined surface of the second tooth 222a of the second ratchet 222. While the first tooth 221a of the first ratchet 221 is moving over the inclined surface of the second tooth 222a of the second ratchet 222, the second ratchet 222 rotates by frictional force between the first and second teeth 221a and 222a, thereby transferring the torque generated from the handle 210 to the socket unit 240.

When the torque transferred to the first ratchet 221 exceeds 9 kg·m, the first tooth 221a may fall to the step of the second tooth 222a. Then, the first tooth 221a may move over the inclined surface of the second tooth 222a until a torque exceeding 9 kg·m is transferred again. That is, the torque exceeding 9 kg·m may not be transferred to the socket unit 240.

On the other hand, upon generation of a torque of 8 kg·m from the handle 210, the first tooth 221*a* may rotate in close contact with the inclined surface of the second tooth 222*b*, thus transferring the torque generated from the handle 210 to the socket unit 240.

Therefore, the torque control wrench assembly 200 for a vehicle may engage a wheel nut with a bolt, with a restricted torque transferred to the socket unit 240 by the ratchet unit 220. Consequently, the resulting prevention of excessive engagement between the wheel nut and the bolt leads to prevention of the wheel nut from damaging or breaking the bolt.

The torque control unit 260 may include a knob 263 at the pressure control unit 262. The knob 263 may be installed on one surface of the pressure control unit 262, which has a predetermined curvature. A movement groove 258 may be formed in the housing 250, along which the knob 263 moves. The movement groove 258 may be recessed in the forward direction. As the knob 263 moves along the movement groove 258, the pressure control unit 262 may be rotated.

Torque levels available to the torque control wrench assembly 200 for a vehicle may be marked on the outer circumferential surface of the housing 250. The torque level markings may be positioned apart from the movement groove 258 by a predetermined distance. Therefore, a user may provide a predetermined torque to the socket unit 240 by moving the knob 263 along the movement groove 258 to an intended torque level at which the wheel nut is to be tightened.

The torque control unit 260 may include a fixing screw 264 on the knob 263, for fixing the pressure control unit 262 at a rotated position. The fixing screw 264 may be rotatably installed on the knob 263. The fixing screw 264 may be screwed in a direction to be brought into close contact with the outer circumferential surface of the housing 250, thereby fixing the pressure control unit 262 at a rotated position.

The torque control wrench assembly 200 for a vehicle may further include a cover 270 which is engaged with the housing 250, covering one surface of the pressure control unit 262. The cover 270 may protect the pressure control unit 262 against an external impact by covering the one surface of the pressure control unit 262.

Figure 5:
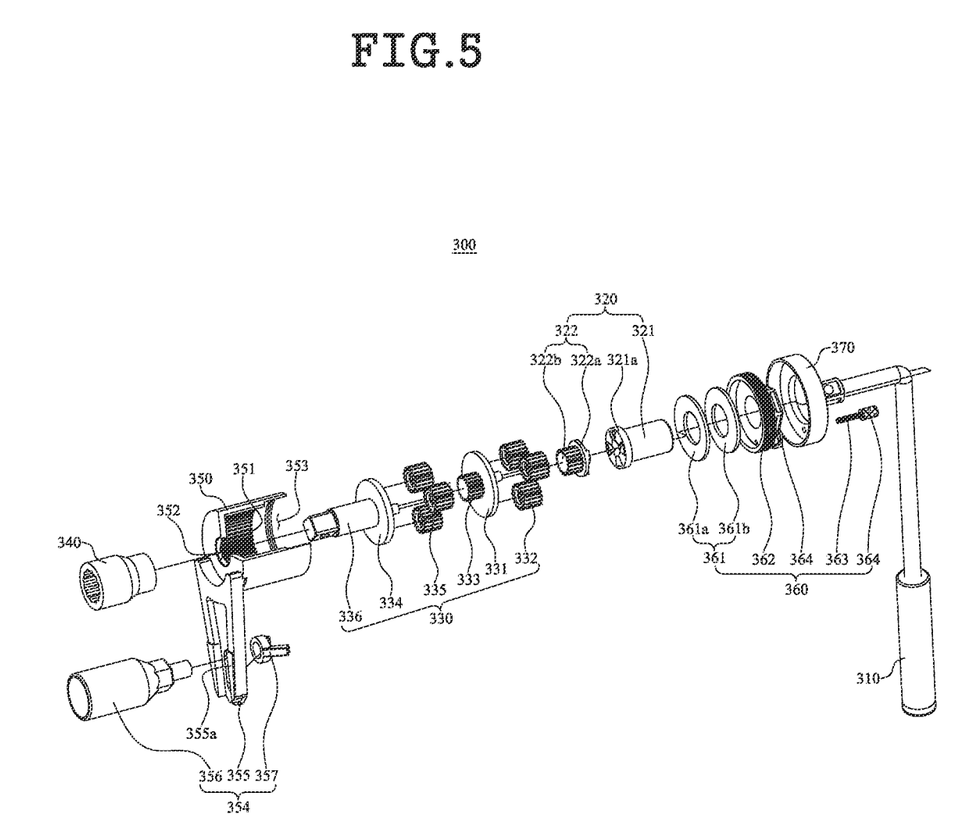
FIG. 5 is an exploded perspective view illustrating a torque control wrench assembly for a vehicle according to another embodiment of the present invention.

FIG. 5 is an exploded perspective view illustrating a torque control wrench assembly 300 for a vehicle according to another embodiment of the present invention. The torque control wrench assembly 300 for a vehicle will be described, centering on the differences from the torque control wrench assemblies 100 and 200 for a vehicle according to the foregoing embodiments of the present invention.

Referring to FIG. 5, the torque control wrench assembly 300 for a vehicle may include a handle 310 for generating rotational force, a ratchet unit 320 having a first ratchet 321 for rotating in engagement with the handle 310 and a second ratchet 322 engaged with the first ratchet 321, for transferring rotational force applied from the first ratchet 321, a transmission unit 330 engaged with the second ratchet 322, for changing the rotational force transferred from the second ratchet 322, a socket unit 340 having one end engaged with the transmission unit 330 and the other end engaged with a wheel nut, for tightening or loosening the wheel nut by receiving the rotational force, a housing 350 opened at both sides, for accommodating the ratchet unit 320 and the transmission unit 330, and a torque control unit 360 into which the first ratchet 321 is inserted and which is engaged with the housing 350, covering an opened end of the housing 350, for controlling rotational force applied to the socket unit 340 by pressing the first ratchet 321 and thus controlling the engagement strength between the first and second ratchets 321 and 322.

Before describing the torque control wrench assembly 300 for a vehicle according to the embodiment of the present invention in detail, a direction toward the socket unit 340 is defined as forward and a direction toward the handle 310 is defined as backward.

A first tooth 321*a* having a step of a predetermined height may be formed at one end of the first ratchet 321. The step of the first tooth 321*a* may face forward.

The second ratchet 322 may be engaged with the first ratchet 321. A second tooth 322*a* corresponding to the first tooth 321*a* of the first ratchet 321 may be formed at one end of the second tooth 322*a*. The second tooth 322*a* may have a step of a predetermined height facing backward. As the second tooth 322*a* of the second ratchet 322 is engaged with the first tooth 321*a* of the first ratchet 321, the second ratchet 322 may be rotated by the first ratchet 321.

When the torque control wrench assembly for a vehicle 300 tightens the wheel nut by clockwise rotation of the handle 310, the ratchet unit 320 rotates with an inclined surface of the first tooth 321*a* in close contact with an inclined surface of the second tooth 322*a*. Therefore, the ratchet unit 320 may transfer torque generated from the handle 310 to the transmission unit 330 which will be described later. On the other hand, when the torque control wrench assembly 300 for a vehicle loosens the wheel nut by counterclockwise rotation of the handle 310, the ratchet unit 320 rotates with the step of the first tooth 321*a* caught over the step of the second tooth 322*a*, thereby transferring torque generated from the handle 310 to the transmission unit 330.

A first sun gear 322*b* may be installed on the other surface of the second ratchet 322.

The transmission unit 330 may include a first transmission 331 which is provided, on one surface thereof, with one or more planet gears 332 engaged with the first sun gear 322*b* and, on the other surface thereof, with a second sun gear 333, and a second transmission 334 which is provided, on one surface thereof, with one or more second planet gears 335 in teeth-engagement with the second sun gear 333 and, on the other surface thereof, with a transfer shaft 336 for transferring rotational force to the socket unit 340.

The housing 350 may be opened at both ends and a guide gear 351 may be formed inside the housing 350, for guiding the first and second planet gears 332 and 335. A first opening 352 having a first diameter may be formed at one opened end of the housing 350 and a second opening 353 having a second diameter may be formed at the other opened end of the housing 350. The second diameter may be larger than the first diameter.

The housing 350 may further include a support unit 354 for fixedly positioning the housing 350. The support unit 354 may include a first support 355 that is extended to a predetermined length from an outer circumferential surface of the housing 350 and has a guide hole 355*a* penetrating through a portion of the first support 355, a second support 356 that is movably installed in the guide hole 355*a* of the first support 355 and engaged with a wheel nut apart from a wheel nut engaged with the socket unit 340 by a predetermined distance, and a fixing nut 357 for fixedly positioning the second support 356.

The torque control unit 360 includes a washer unit 361 for pressing or releasing the first ratchet 321. The washer unit 361 may include a first washer 361*a* brought into close contact with one surface of the first ratchet 321. A hole may penetrate through the center of the first washer 361*a*, for allowing the first ratchet 321 to be inserted thereinto. The first washer 361a may be formed in such a manner that it gets higher toward its center. Herein, the height of the first washer 361a may increase in the forward direction.

The washer unit 361 may include a second washer 361b brought into close contact with one surface of the first washer 361a. A hole may penetrate through the center of the second washer 361b, for allowing the first ratchet 321 to be inserted thereinto. The second washer 361b may be formed in such a manner that its height increases toward its center. Herein, the height of the second washer 361b may increase in the backward direction. That is, a section of the washer unit 361 in which the second washer 361b closely contacts the first washer 361a may be shaped into a diamond.

The torque control unit 360 may include a pressure control unit 362 engaged with the housing 350, covering an opened end of the housing 350, for controlling pressure applied to the first ratchet 321 by the washer unit 361 by pressing or releasing the washer unit 361.

The pressure control unit 362 may be inserted into the housing 350. A hole may penetrate through the center of the pressure control unit 362, for allowing the first ratchet 321 to be inserted thereinto. The pressure control unit 362 may have a screw thread formed on its outer circumferential surface and the housing 350 may have a screw thread formed on an inner circumferential surface thereof in correspondence with the screw thread of the pressure control unit 362.

That is, the pressure control unit 362 may be rotatably installed in the housing 350. The pressure control unit 362 may rotate, moving forward or backward inside the housing 350. Therefore, the pressure control unit 362 may press or release the second washer 361b.

When the pressure control unit 362 presses or releases the second washer 361b, the first washer 361a closely contacting the second washer 361b may press or release the first ratchet 321. Since the first washer 361a controls the engagement strength between the first and second ratchets 321 and 322, the amount of torque generated from the torque control wrench assembly 300 for a vehicle may be restricted.

For example, when the pressure control unit 362 rotates clockwise and thus moves forward, pressing the second washer 361b, the engagement force between the first and second ratchets 321 and 322 may be equivalent to a torque of 13 kg·m.

Subsequently, upon generation of a torque of 16 kg·m from the handle 310, the first tooth 321a of the first ratchet 321 may move over the inclined surface of the second tooth 322a of the second ratchet 322. While the first tooth 321a of the first ratchet 321 is moving over the inclined surface of the second tooth 322a, the second ratchet 322 rotates by frictional force between the first and second teeth 321a and 322a, thereby transferring the torque generated from the handle 310 to the socket unit 340.

When the torque transferred to the first ratchet 321 exceeds 13 kg·m, the first tooth 321a may fall to the step of the second tooth 322a. Then, the first tooth 321a may move over the inclined surface of the second tooth 322a until a torque exceeding 13 kg·m is transferred again. That is, the torque exceeding 13 kg·m may not be transferred to the socket unit 340.

On the other hand, upon generation of a torque of 10 kg·m from the handle 310, the first tooth 321a may rotate in close contact with the inclined surface of the second tooth 322b, thus transferring the torque generated from the handle 310 to the socket unit 340.

When the pressure control unit 362 rotates counterclockwise, moves backward, and thus presses the second washer 361b with a weakening force, the engagement force between the first and second ratchets 321 and 322 may be equivalent to a torque of 9 kg·m.

Upon generation of a torque of 15 kg·m from the handle 310, the first tooth 321a of the first ratchet 321 may move over the inclined surface of the second tooth 322a of the second ratchet 322. While the first tooth 321a of the first ratchet 321 is moving over the inclined surface of the second tooth 322a of the second ratchet 322, the second ratchet 322 rotates by frictional force between the first and second teeth 321a and 322a, thereby transferring the torque generated from the handle 310 to the socket unit 340.

When the torque transferred to the first ratchet 321 exceeds 9 kg·m, the first tooth 321a may fall to the step of the second tooth 322a. Then, the first tooth 321a may move over the inclined surface of the second tooth 322a until a torque exceeding 9 kg·m is transferred again. That is, the torque exceeding 9 kg·m may not be transferred to the socket unit 340.

On the other hand, upon generation of a torque of 8 kg·m from the handle 310, the first tooth 321a may rotate in close contact with the inclined surface of the second tooth 322b, thus transferring the torque generated from the handle 310 to the socket unit 340.

Therefore, the torque control wrench assembly 300 for a vehicle may engage a wheel nut with a bolt, with a restricted torque transferred to the socket unit 340 by the ratchet unit 320. Consequently, the resulting prevention of excessive engagement between the wheel nut and the bolt leads to prevention of the wheel nut from damaging or breaking the bolt.

The torque control unit 360 may include a knob 363 at the pressure control unit 362. The knob 363 may be installed at a portion of the pressure control unit 362, in parallel to the length direction of the first ratchet 321.

The torque control wrench assembly 300 for a vehicle may further include a cover 370 which is engaged with the housing 350, covering one surface of the pressure control unit 362. A handle insertion hole (not shown) may penetrate into a portion of the cover 270, for allowing the knob 363 to be inserted thereinto and moved therein. As the knob 363 moves along the insertion hole, the pressure control unit 362 may rotate.

The torque control unit 360 may be provided with a fixing screw 364 on the knob 363, for fixing the pressure control unit 362 at a rotated position. The fixing screw 364 may be rotatably installed on the knob 363. The fixing screw 364 may be screwed in a direction to be brought into close contact with the outer circumferential surface of the cover 370, thereby fixing the pressure control unit 362 at a rotated position.

The torque control wrench assembly 300 for a vehicle may further include an indicator 365 interposed between the pressure control unit 362 and the cover 370 and engaged with the knob 363. The indicator 365 may indicate a marking corresponding to the level of torque output from the torque control wrench assembly 300 for a vehicle. Therefore, a user can provide a predetermined torque to the socket unit 340 by moving the knob 363 along the handle insertion hole to an intended torque level for tightening the wheel nut.

Figure 6:
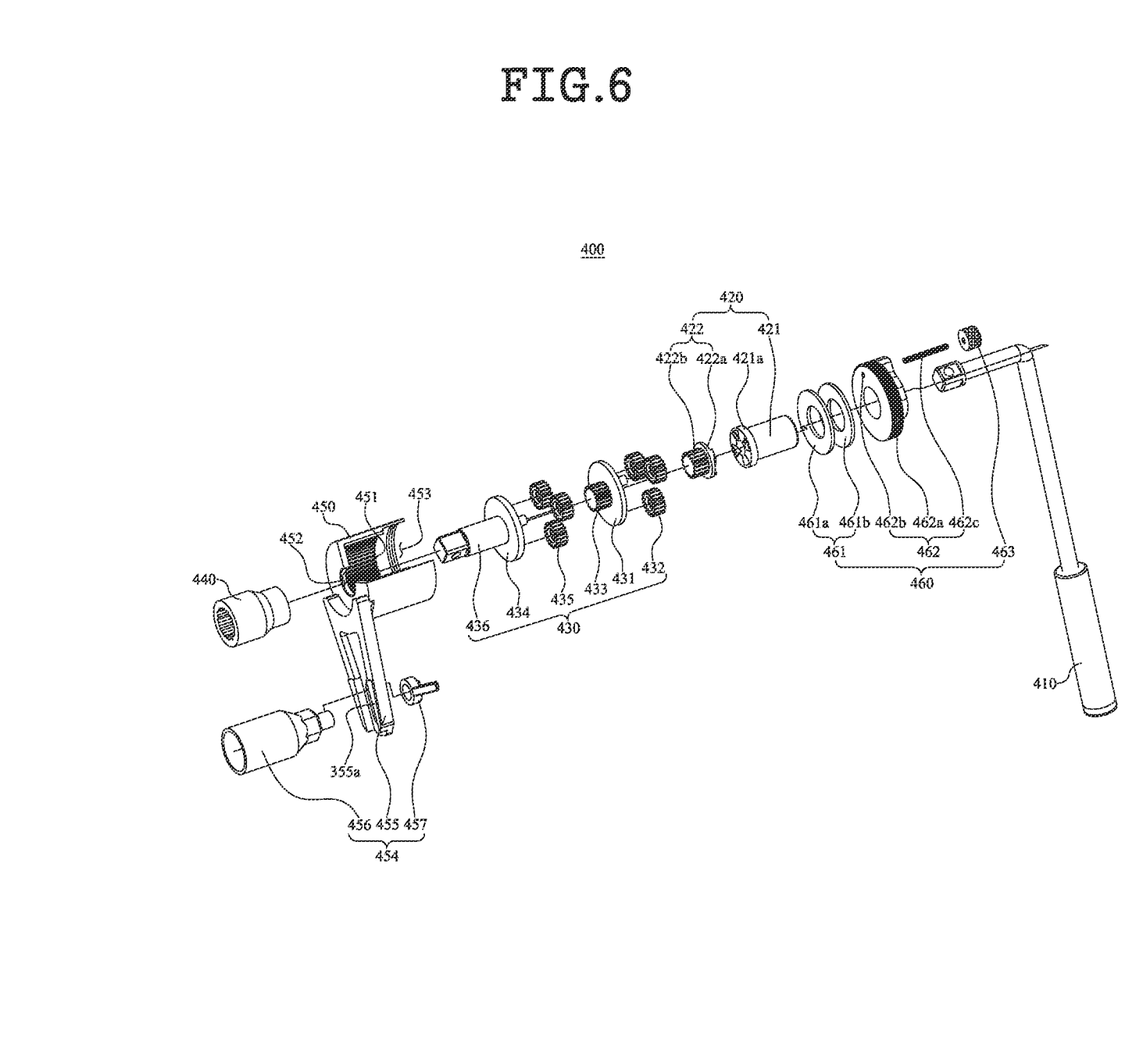
FIG. 6 is an exploded perspective view illustrating a torque control wrench assembly for a vehicle according to a further embodiment of the present invention.

FIG. 6 is an exploded perspective view illustrating a torque control wrench assembly 400 for a vehicle according to a further embodiment of the present invention. The torque control wrench assembly 400 for a vehicle will be described, centering on the differences from the torque control wrench assemblies 100, 200 and 300 for a vehicle according to the foregoing embodiments of the present invention.

Referring to FIG. 6, the torque control wrench assembly 400 for a vehicle may include a handle 410 for generating rotational force, a ratchet unit 420 having a first ratchet 421 for rotating in engagement with the handle 410 and a second ratchet 422 engaged with the first ratchet 421, for transferring rotational force applied from the first ratchet 421, a transmission unit 430 engaged with the second ratchet 422, for changing the rotational force transferred from the second ratchet 422, a socket unit 440 having one end engaged with the transmission unit 430 and the other end engaged with a wheel nut, for tightening or loosening the wheel nut by receiving the rotational force, a housing 450 opened at both ends, for accommodating the ratchet unit 420 and the transmission unit 430, and a torque control unit 460 into which the first ratchet 421 is inserted and which is engaged with the housing 450, covering an opened end of the housing 450, for controlling rotational force applied to the socket unit 440 by pressing the first ratchet 421 and thus controlling the engagement strength between the first and second ratchets 421 and 422.

Before describing the torque control wrench assembly 400 for a vehicle according to the embodiment of the present invention in detail, a direction toward the socket unit 440 is defined as forward and a direction toward the handle 410 is defined as backward.

A first tooth 421a having a step of a predetermined height may be formed at one end of the first ratchet 421. The step of the first tooth 421a may face forward.

The second ratchet 422 may be engaged with the first ratchet 421. A second tooth 422a corresponding to the first tooth 421a of the first ratchet 421 may be formed at one end of the second tooth 422a. The second tooth 422a may have a step of a predetermined height facing backward. As the second tooth 422a of the second ratchet 422 is engaged with the first tooth 421a of the first ratchet 421, the second ratchet 422 may be rotated by the first ratchet 421.

When the handle 410 rotates clockwise and thus the torque control wrench assembly 400 for a vehicle tightens a wheel nut, the ratchet unit 420 rotates with an inclined surface of the first tooth 421a in close contact with an inclined surface of the second tooth 422a. Therefore, the ratchet unit 420 may transfer the torque generated from the handle 410 to the transmission unit 430 which will be described later. On the other hand, when the handle 410 rotates counterclockwise and thus the torque control wrench assembly 400 for a vehicle loosens the wheel nut, the ratchet unit 420 rotates with the step of the first tooth 421a caught over the step of the second tooth 422a, thereby transferring torque generated from the handle 410 to the transmission unit 430.

A first sun gear 422b may be installed on the other surface of the second ratchet 422.

The transmission unit 430 may include a first transmission 431 which is provided, on one surface thereof, with one or more planet gears 432 engaged with the first sun gear 422b and, on the other surface thereof, with a second sun gear 433, and a second transmission 434 which is provided with, on one surface thereof, with one or more second planet gears 435 in teeth-engagement with the second sun gear 433 and, on the other surface thereof, with a transfer shaft 436 for transferring rotational force to the socket unit 440.

The housing 450 may be opened at both ends and a guide gear 451 may be formed inside the housing 450, for guiding the first and second planet gears 432 and 435. A first opening 452 having a first diameter may be formed at one opened end of the housing 450 and a second opening 453 having a second diameter may be formed at the other opened end of the housing 450. The second diameter may be larger than the first diameter.

The housing 450 may further include a support unit 454 for fixedly positioning the housing 450. The support unit 454 may include a first support 455 that is extended to a predetermined length from an outer circumferential surface of the housing 450 and has a guide hole 455a penetrating through a portion of the first support 455, a second support 456 that is movably installed in the guide hole 455a of the first support 455 and engaged with a wheel nut apart from a wheel nut engaged with the socket unit 440 by a predetermined distance, and a fixing nut 457 for fixedly positioning the second support 456.

The torque control unit 460 includes a washer unit 461 for pressing or releasing the first ratchet 421. The washer unit 461 may include a first washer 461a brought into close contact with one surface of the first ratchet 421. A hole may penetrate through the center of the first washer 461a, for allowing the first ratchet 421 to be inserted thereinto. The first washer 461a may be formed in such a manner that it gets higher toward its center. Herein, the height of the first washer 461a may increase in the forward direction.

The washer unit 461 may include a second washer 461b brought into close contact with one surface of the first washer 461a. A hole may penetrate through the center of the second washer 461b, for allowing the first ratchet 421 to be inserted thereinto. The second washer 461b may be formed in such a manner that its height increases toward its center. Herein, the height of the second washer 461b may increase in the backward direction. That is, a section of the washer unit 461 in which the second washer 461b closely contacts the first washer 461a may be shaped into a diamond.

The torque control unit 460 may include a pressure control unit 462 engaged with the housing 450, covering an opened end of the housing 450, for controlling pressure applied to the first ratchet 421 by the washer unit 461 by pressing or releasing the washer unit 461.

The pressure control unit 462 may include a first pressure controller 462a that is installed in the housing 450, covering the second opening 453 of the housing 450. An installation hole 462b may penetrate through the first pressure controller 462a. The installation hole 462b may be parallel to the length direction of the first ratchet 421.

The pressure control unit 462 may include a second pressure controller 462c inserted into the installation hole 462b of the first pressure controller 462a, for pressing the second washer 461b. The second pressure controller 462c may be screwed into the first pressure controller 462a and thus the length of a part of the second pressure controller 462c exposed from the first pressure controller 462a may be adjusted. The second pressure controller 462c may press or release the second washer 461b through adjustment of the length of the exposed part of the second pressure controller 462c.

When the second pressure controller 462c presses or releases the second washer 461b, the first washer 461a closely contacting the second washer 461b may press or release the first ratchet 421. Since the first washer 461a controls the engagement strength between the first and second ratchets 421 and 422, the amount of torque generated from the torque control wrench assembly 400 for a vehicle may be restricted.

For example, when the second pressure controller 462c rotates clockwise and thus moves forward, pressing the second washer 461b, the engagement force between the first and second ratchets 421 and 422 may be equivalent to a torque of 13 kg·m.

Subsequently, upon generation of a torque of 16 kg·m from the handle 410, the first tooth 421a of the first ratchet 421 may move over the inclined surface of the second tooth 422a of the second ratchet 422. While the first tooth 421a of the first ratchet 421 is moving over the inclined surface of the second tooth 422a, the second ratchet 422 rotates by frictional force between the first and second teeth 421a and 422a, thereby transferring the torque generated from the handle 410 to the socket unit 440.

When the torque transferred to the first ratchet 421 exceeds 13 kg·m, the first tooth 421a may fall to the step of the second tooth 422a. Then, the first tooth 421a may move over the inclined surface of the second tooth 422a until a torque exceeding 13 kg·m is transferred again. That is, the torque exceeding 13 kg·m may not be transferred to the socket unit 440.

On the other hand, upon generation of a torque of 10 kg·m from the handle 410, the first tooth 421a may rotate in close contact with the inclined surface of the second tooth 422b, thus transferring the torque generated from the handle 410 to the socket unit 440.

When the second pressure controller 462c rotates counterclockwise, moves backward, and thus presses the second washer 462b with a weakening force, the engagement force between the first and second ratchets 421 and 422 may be equivalent to a torque of 9 kg·m.

Subsequently, upon generation of a torque of 15 kg·m from the handle 410, the first tooth 421a of the first ratchet 421 may move over the inclined surface of the second tooth 422a of the second ratchet 422. While the first tooth 421a of the first ratchet 421 is moving over the inclined surface of the second tooth 422a of the second ratchet 422, the second ratchet 422 rotates by frictional force between the first and second teeth 421a and 422a, thereby transferring the torque generated from the handle 410 to the socket unit 440.

When the torque transferred to the first ratchet 421 exceeds 9 kg·m, the first tooth 421a may fall to the step of the second tooth 422a. Then, the first tooth 421a may move over the inclined surface of the second tooth 422a until a torque exceeding 9 kg·m is transferred again. That is, the torque exceeding 9 kg·m may not be transferred to the socket unit 440.

On the other hand, upon generation of a torque of 8 kg·m from the handle 410, the first tooth 421a may rotate in close contact with the inclined surface of the second tooth 422b, thus transferring the torque generated from the handle 410 to the socket unit 440.

Therefore, the torque control wrench assembly 400 for a vehicle may engage a wheel nut with a bolt, with a restricted torque transferred to the socket unit 440 by the ratchet unit 420. Consequently, the resulting prevention of excessive engagement between the wheel nut and the bolt leads to prevention of the wheel nut from damaging or breaking the bolt.

The torque control unit 460 may include a knob 463. The knob 463 may be engaged with one end of the second pressure controller 462c. As the knob 463 is fixed on one end of the second pressure controller 462c, it may rotate the second pressure controller 462c. That is, when the knob 463 is rotated in a direction, the second pressure controller 462c engaged with the knob 463 may rotate in the same direction as the knob 463. Accordingly, a user can readily rotate the second pressure controller 462c.

As is apparent from the above description, a torque control wrench assembly for a vehicle according to the present invention has a torque control unit at one side of a housing, for controlling the engagement strength between first and second ratchets. Therefore, a predetermined torque may be transferred to a socket unit engaged with a wheel nut.

Since the torque control unit is installed so as to cover an opened end of the housing in which a ratchet unit and a transmission unit are accommodated, the wrench assembly can be miniaturized, thereby increasing its portability.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A torque control wrench assembly for a vehicle, comprising:
a handle for generating rotational force;
a ratchet unit having a first ratchet for rotating in engagement with the handle and a second ratchet engaged with the first ratchet, for transferring rotational force applied from the first ratchet;
a transmission unit engaged with the second ratchet, for changing the rotational force transferred from the second ratchet;
a socket unit having one end engaged with the transmission unit and the other end engaged with a wheel nut, for tightening or loosening the wheel nut by receiving the rotational force;
a housing opened at both ends, for accommodating the ratchet unit and the transmission unit; and
a torque control unit into which the first ratchet is inserted and which is engaged with the housing, covering an opened end of the housing, for controlling the rotational force applied to the socket unit by pressing the first ratchet and thus controlling engagement strength between the first and second ratchets,
wherein the torque control unit comprises:
a washer unit for pressing or releasing the first ratchet; and
a pressure control unit engaged with the housing, covering the opened end of the housing, for controlling pressure that the washer unit applies to the first ratchet by pressing or releasing the washer unit,
wherein the washer unit comprises:
a first washer having a height increasing toward a center of the first washer, for allowing the first ratchet to be inserted thereinto in close contact with one surface of the first ratchet; and
a second washer having a height increasing toward a center of the second washer and closely contacting the first washer, for allowing the first ratchet to be inserted thereinto,
wherein the pressure control unit comprises:
a first pressure controller engaged with the housing, covering the opened end of the housing, for allowing the first ratchet to be inserted thereinto;
a second pressure controller rotatably engaged with the first pressure controller, for allowing the first ratchet to be inserted thereinto and pressing the second washer by rotating in a direction in close contact with one surface of the second washer;
a fastening portion located along an outer circumferential surface of a center hole of the second pressure controller and interposed between the first pressure controller and the first ratchet, wherein the fastening portion is mounted at the center hole of the first pressure controller such that the second pressure controller is rotatably engaged with the first pressure controller by the fastening portion, and the second pressure controller presses or releases the second washer by the fastening portion, and a locker installed at the second pressure controller, for fixedly locking the second pressure controller at a rotated position,
wherein an installation hole penetrates through the second pressure controller, for allowing the locker to be inserted thereinto,
wherein at least one locking groove is formed into a surface of the first pressure controller that contacts the second pressure controller,
wherein the locker comprises:
a ball inserted into the installation hole and partially inserted into the at least one locking groove;
a spring inserted into the installation hole to elastically support the ball; and
a cover screwed into the installation hole, for fixedly positioning the spring.

2. The torque control wrench assembly according to claim 1, wherein a first sun gear is installed on one surface of the second ratchet.

3. The torque control wrench assembly according to claim 2, wherein the transmission unit comprises:
a first transmission having a first planet gear engaged with the first sun gear on one surface of the first transmission and a second sun gear on the other surface of the first transmission; and
a second transmission having a second planet gear engaged with the second sun gear on one surface of the second transmission and a transfer shaft on the other surface of the second transmission, for transferring the rotational force to the socket unit.

4. The torque control wrench assembly according to claim 3, wherein a guide gear is formed in the housing, for guiding the first and second planet gears.

5. The torque control wrench assembly according to claim 1, wherein the housing further comprises a support unit for fixedly positioning the housing.

6. The torque control wrench assembly according to claim 5, wherein the support unit comprises:
a first support extended to a predetermined length from an outer circumferential surface of the housing;
a second support movably installed at the first support and engaged with a wheel nut apart from the wheel nut engaged with the socket unit by a predetermined distance; and a fixing nut for fixedly positioning the second support.

7. A torque control wrench assembly for a vehicle, comprising:
a handle that, in use, generates rotational force;
a ratchet unit having i) a first ratchet that rotates in engagement with the handle and ii) a second ratchet engaged with the first ratchet, the second ratchet transferring rotational force applied from the first ratchet;
a transmission unit engaged with the second ratchet, the transmission unit changing the rotational force transferred from the second ratchet;
a socket unit having a first end engaged with the transmission unit and an opposite second end that engages with a wheel nut to tighten or loosen the wheel nut by receiving the rotational force from the transmission unit;
a housing opened at opposite first and second ends with first and second openings respectively at the first and second ends, the housing accommodating the ratchet unit and the transmission unit; and
a torque control unit engaged with the housing, the first ratchet inserted into the torque control unit, the torque control unit for controlling the rotational force applied to the socket unit by pressing the first ratchet and thereby controlling engagement strength between the first and second ratchets,
wherein the torque control unit include
i) a washer unit that presses or releases the first ratchet by respectively a first surface of the washer unit being brought into contact with one surface of the first ratchet or being brought out of contact with one surface of the first ratchet; and
ii) a pressure control unit engaged with the housing and covering an exterior surface of the first opening at the first end of the housing, the pressure control unit controlling pressure that the washer unit applies to the first ratchet by pressing or releasing the washer unit,
wherein the washer unit comprises:
a first washer with a center hole, the first ratchet being insertable through the center hole of the first washer, the first washer having a height increasing in a forward direction toward the center hole, and
a second washer with a center hold and having a height increasing in a backward direction toward the center hole of the second washer, the second washer contacting the first washer, the first ratchet being insertable through the center hole of the second washer,
wherein the pressure control unit comprises:
a first pressure controller engaged with the housing and covering the exterior surface of the first opening at the first end of the housing, the first ratchet to be inserted being insertable into the first pressure controller, the first pressure controller having a center hole with a screw thread on an inner surface of the center hole,
a second pressure controller rotatably engaged with the first pressure controller, the first ratchet being insertable into the second pressure controller and pressing the second washer by rotating in a direction in contact with one surface of the second washer, the second pressure controller having a center hole,
a fastening portion formed along an outer circumferential surface of the center hole of the second pressure controller, the fastening portion protruding in a forward direction and being interposed between the first pressure controller and the first ratchet, the fastening portion having a screw thread on an outer circumferential surface, the fastening portion being screwed into the center hole of the first pressure controller such that the second pressure controller is rotatably engaged with the first pressure controller by the fastening portion, and the second pressure controller presses or releases the second washer by the fastening portion,
a locking unit, installed at the second pressure controller, that fixedly locks the second pressure controller at a rotated position,
wherein an installation hole penetrates through the second pressure controller and allows the locker to be inserted thereinto,
wherein at least one locking groove is located on a surface of the first pressure controller that contacts the second pressure controller,
wherein the locking unit comprises:
a ball inserted into the installation hole and partially inserted into the at least one locking groove;
a spring inserted into the installation hole to elastically support the ball, and
a cover, screwed into the installation hole, and fixedly positioning the spring.

* * * * *